United States Patent
Huang

(10) Patent No.: US 9,662,815 B2
(45) Date of Patent: May 30, 2017

(54) VERTICAL INJECTION MOLDING MACHINE

(71) Applicant: TIEN KANG CO., LTD., Taichung (TW)

(72) Inventor: David Huang, Taichung (TW)

(73) Assignee: Tien Kang Co., Ltd., Taichung (TW)

( * ) Notice: Subject to any disclaimer, the term of this patent is extended or adjusted under 35 U.S.C. 154(b) by 207 days.

(21) Appl. No.: 14/801,441

(22) Filed: Jul. 16, 2015

(65) Prior Publication Data

US 2016/0288385 A1 Oct. 6, 2016

(30) Foreign Application Priority Data

Apr. 2, 2015 (TW) .............................. 104204998 U

(51) Int. Cl.
*B29C 45/03* (2006.01)
*B29C 45/70* (2006.01)
*B29C 45/17* (2006.01)

(52) U.S. Cl.
CPC .......... *B29C 45/03* (2013.01); *B29C 45/1761* (2013.01); *B29C 45/706* (2013.01)

(58) Field of Classification Search
CPC .... B29C 45/03; B29C 45/1761; B29C 45/706
USPC ....................................................... 425/594
See application file for complete search history.

(56) References Cited

U.S. PATENT DOCUMENTS

| | | | | | |
|---|---|---|---|---|---|
| 2,428,275 | A | * | 9/1947 | Frankwich | B29C 45/0441 164/314 |
| 3,015,848 | A | * | 1/1962 | Hollfritsch | B29C 45/681 425/593 |
| 5,482,454 | A | * | 1/1996 | Miyahara | B29C 45/1761 100/231 |

FOREIGN PATENT DOCUMENTS

| | | | |
|---|---|---|---|
| JP | 05-337977 | * | 12/1993 |
| JP | 06-071653 | * | 3/1994 |

* cited by examiner

*Primary Examiner* — Jill Heitbrink
(74) *Attorney, Agent, or Firm* — Wang Law Firm, Inc.

(57) ABSTRACT

A vertical injection molding machine is provided with a base, a lower mold mounting unit, an injection device, a pressing mold unit, and an upper mold mounting unit. Since the pressing mold unit and the injection device are all disposed on the upper seat of the base, and therefore are located above the lower seat, the lower mold mounting unit, the upper mold and the lower mold. With this design, the height to the ground from the lower seat can be substantially reduced. Namely, the heights of the lower seat, the lower mold mounting unit and the upper and lower molds with respect to the user are reduced to an ergonomic height, which makes operation of the injection molding easier and convenient, while reducing danger and enhancing work safety.

5 Claims, 6 Drawing Sheets

VERTICAL INJECTION MOLDING MACHINE

CROSS REFERENCE TO RELATED APPLICATION

This application claims the benefit of priority to TW 104204998, filed on Apr. 2, 2015 with the Intellectual Property Office of the Republic of China, Taiwan, the entire specification of which is incorporated herein by reference.

BACKGROUND OF THE INVENTION

Field of the Invention

The present invention relates to an injection molding machine, and more particularly to a vertical injection molding machine.

Description of the Prior Art

Injection molding machines have been widely used in various fields, including household industry, electronic, electric appliances, automobile, and motorcycle components. The existing injection molding machines are generally categorized into vertical type and horizontal type based on the direction of plastic injection. As for the vertical injection molding machine, the injection unit and the molds are vertically disposed on a base, and plastic is injected in the vertical direction by the injection unit.

Before the injection unit of the vertical injection molding machine performs injection of plastic in the vertical direction, the procedure of mold clamping or pressing has to be carried. The implementation of the procedure of mold clamping requires the use of a mold clamping device. The conventional mold clamping device is normally disposed below the lower mold platform of the vertical injection machine to drive the lower mold platform to move back and forth longitudinally to make the lower mold on the lower mold platform move towards or away from the upper mold, causing opening or closing of the upper and lower molds.

However, the conventional mold clamping device is normally disposed below the lower mold platform of the vertical injection machine, as a result, the height of the lower mold platform is too high, which makes it inconvenient for the worker to pick up material or operate the machine. The common solution is to put a footrest in the front of the vertical injection machine for the worker to stand on it, so that the height of the lower mold platform is relatively reduced. However, the worker is likely to get hurt once he misses his step.

The present invention has arisen to mitigate and/or obviate the afore-described disadvantages.

SUMMARY OF THE INVENTION

The present invention is aimed at providing a vertical injection molding machine which provides an ergonomic work height, which makes operation of the injection molding easier and convenient, while reducing danger and enhancing work safety.

Therefore, a vertical injection molding machine in accordance with the present invention includes: a base with a lower seat and an upper seat above the lower seat; a lower mold mounting unit disposed at the lower seat and provided for mounting of a lower mold and an upper mold; an injection device including a plurality of guiding shafts longitudinally disposed on the upper seat, an injection seat movably disposed on the guiding shafts, a feeding seat which is movable mounted on the guiding shafts and located between the injection seat and the upper seat, and an injection unit which is longitudinally disposed on the injection seat and inserted out of the feeding seat and includes an injection hole; a pressing mold unit including a pressing seat and a pressing mold shaft, the pressing seat being fixed in the upper seat of the base and including a longitudinal hole, the pressing mold shaft being movably inserted in the longitudinal hole and also including a longitudinal hole for insertion of the injection unit, and a lower connecting surface; and an upper mold mounting unit including an upper surface fixed to the lower connecting surface of the pressing mold shaft, a lower surface abutted against the upper mold, and a feeding passage which is in communication with the upper and lower surface and aligned with the injection hole. By such arrangements, the pressing mold shaft is controlled to move longitudinally back and forth to press against or disengage from the upper and lower molds, and the injection seat is controlled to move longitudinally back and forth to make the injection hole of the injection unit connect to or disengage from the feeding passage of the upper mold mounting unit.

Preferably, the number of the guiding shafts is two, the injection seat further includes two injection sleeves sleeved onto the guiding shafts, and two pistons, the feeding seat further includes two feeding sleeves sleeved onto the guiding shafts, two piston sleeves which are disposed between the feeding sleeves and provided for insertion of the two pistons, and a feeding portion which is disposed between the two piston sleeves for insertion of the injection unit and includes a feeding hole.

Preferably, a first annular flange is disposed at an upper edge of the longitudinal hole of the pressing seat, at a lower edge of the longitudinal hole is disposed a second annular flange which is smaller than the first annular flange, the pressing mold shaft further includes a first shaft portion airtightly disposed in the first annular flange, a middle shaft portion airtightly disposed in the second annular flange, a second shaft portion located between the first and the middle shaft portions, and airtightly disposed in the longitudinal hole of the pressing seat, and the middle shaft portion is larger than the first shaft portion but smaller than the second shaft portion.

Preferably, the pressing seat further includes a first hole which is located adjacent to the first annular flange, and a second hole which is located adjacent to the second annular flange and in communication with the longitudinal hole of the pressing seat.

Preferably, the upper mold includes an upper mold feeding passage in communication with the feeding passage of the upper mold mounting unit.

DETAILED DESCRIPTION OF THE PREFERRED EMBODIMENTS

Figure 1:
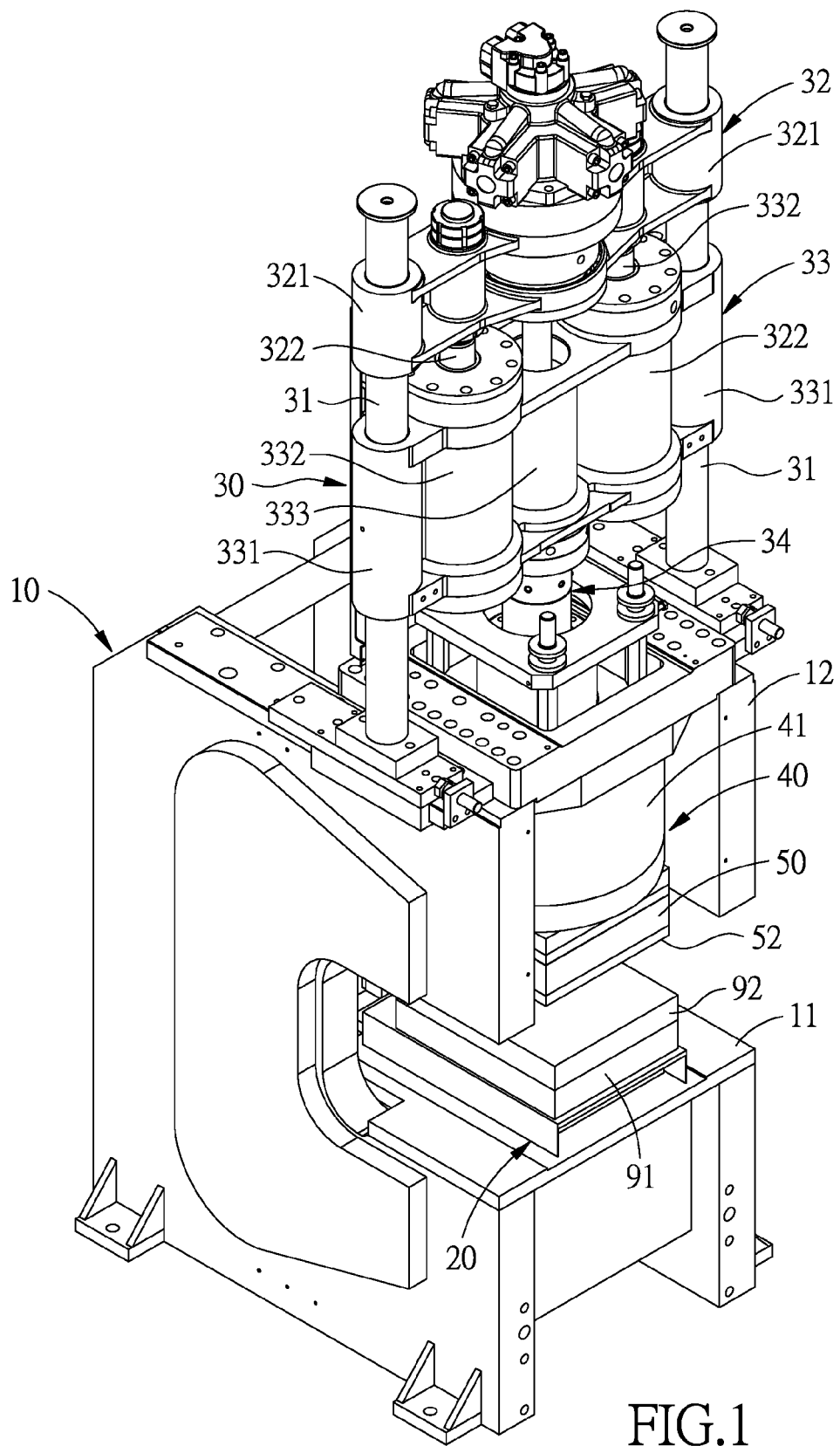
FIG. 1 is a perspective view of a vertical injection molding machine in accordance with the present invention.

The present invention will be clearer from the following description when viewed together with the accompanying drawings, which show, for purpose of illustrations only, the preferred embodiment in accordance with the present invention.

Referring to FIGS. 1-4, a vertical injection molding machine in accordance with the present invention is provided with a base 10, a lower mold mounting unit 20, an injection device 30, a pressing mold unit 40, and an upper mold mounting unit 50.

The base 10 includes a lower seat 11 and an upper seat 12 above the lower seat 11. In this embodiment, the base 10 looks C-shaped from a side view, and the upper seat 12 is a hollow structure in the longitudinal direction.

The lower mold mounting unit 20 is disposed at the lower seat 11 and provided for mounting of a lower mold 91. The lower mold mounting unit 20 is aligned with the upper seat 12, and on the lower mold 91 is disposed an upper mold 92.

Figure 3:
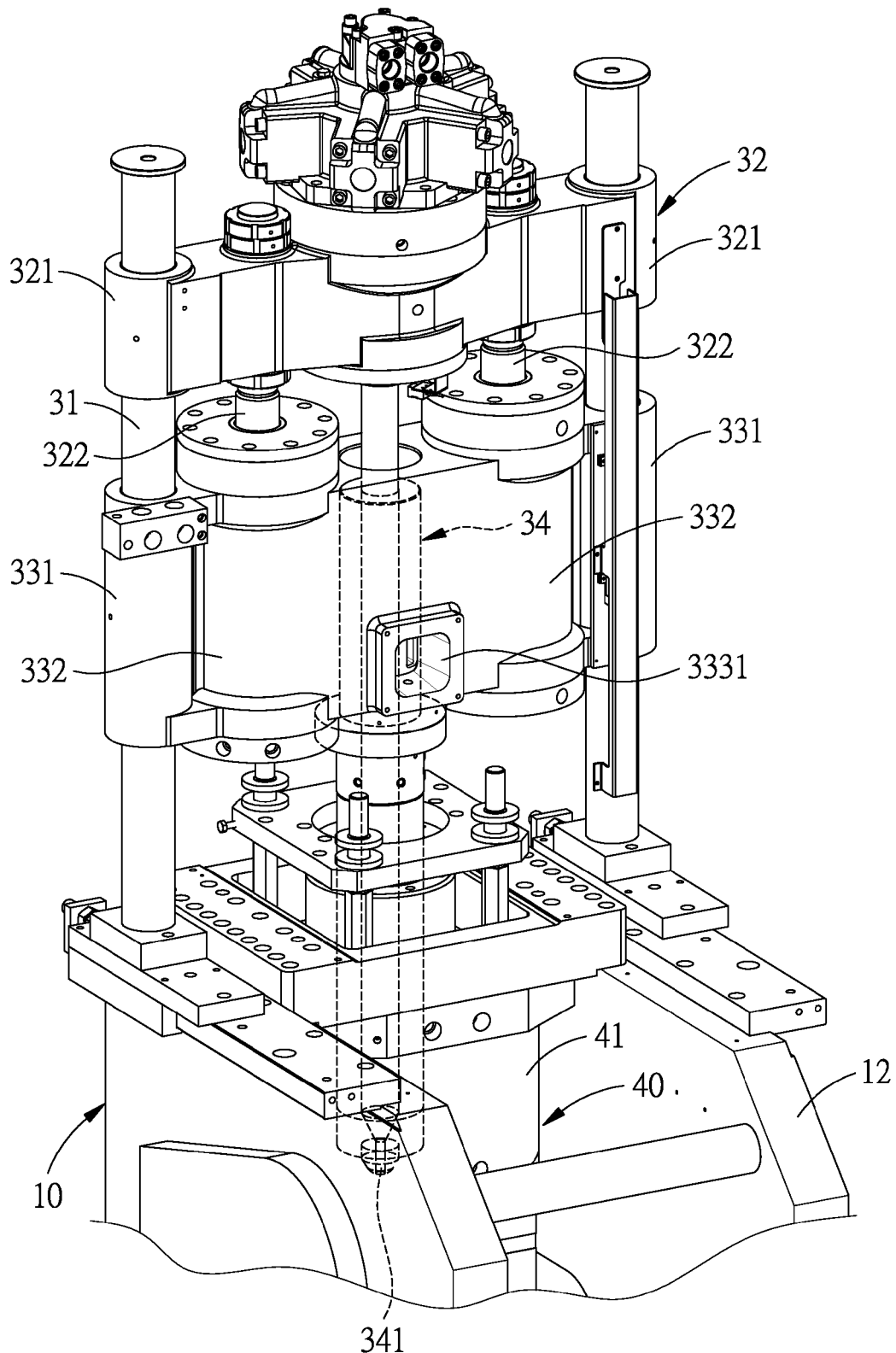
FIG. 3 is a rear view of a part of the vertical injection molding machine in accordance with the present invention.

The injection device 30 includes a plurality of guiding shafts 31 longitudinally disposed on the upper seat 12, an injection seat 32 movably disposed on the guiding shafts 31, a feeding seat 33 which is movable mounted on the guiding shafts 31 and located between the injection seat 32 and the upper seat 12, and an injection unit 34 which is longitudinally disposed on the injection seat 32 and inserted out of the feeding seat 33 and includes an injection hole 341. In this embodiment, there are two guiding shafts 31. The injection seat 32 further includes two injection sleeves 321 sleeved onto the guiding shafts 31, and two pistons 322. The feeding seat 33 further includes two feeding sleeves 331 sleeved onto the guiding shafts 31, two piston sleeves 332 which are disposed between the feeding sleeves 331 and provided for insertion of the two pistons 322, and a feeding portion 333 (as shown in FIG. 3) which is disposed between the two piston sleeves 332 for insertion of the injection unit 34 and includes a feeding hole 3331. It is to be noted that the injection unit 34 is a conventional structure and is not the key point of the present invention, and therefore, the details are omitted here.

The pressing mold unit 40 includes a pressing seat 41 and a pressing mold shaft 42. The pressing seat 41 is fixed in the upper seat 12 of the base 10 and includes a longitudinal hole 411. The pressing mold shaft 42 is movably inserted in the longitudinal hole 411 and also includes a longitudinal hole 421 for insertion of the injection unit 34, and a lower connecting surface 422. In this embodiment, at the upper edge of the longitudinal hole 411 of the pressing seat 41 is disposed a first annular flange 412, and at the lower edge of the longitudinal hole 411 is disposed a second annular flange 413 which is smaller than the first annular flange 412. The pressing mold shaft 42 further includes a first shaft portion 423 airtightly disposed in the first annular flange 412, a middle shaft portion 424 airtightly disposed in the second annular flange 413, and a second shaft portion 425 located between the first and the middle shaft portions 423, 424 and airtightly disposed in the longitudinal hole 411 of the pressing seat 41. The middle shaft portion 424 is larger than the first shaft portion 423 but smaller than the second shaft portion 425. The pressing seat 41 further includes a first hole 414 which is located adjacent to the first annular flange 412, and a second hole 415 which is located adjacent to the second annular flange 413 and in communication with the longitudinal hole 411 of the pressing seat 41.

The upper mold mounting unit 50 includes an upper surface 51 fixed to the lower connecting surface 422 of the pressing mold shaft 42, a lower surface 52 abutted against the upper mold 92, and a feeding passage 53 which is in communication with the upper and lower surface 51, 52 and aligned with the injection hole 341. In this embodiment, the upper mold 92 includes an upper mold feeding passage 921 in communication with the feeding passage 53 of the upper mold mounting unit 50.

By such arrangements, the pressing mold shaft 42 can be controlled to move longitudinally back and forth to press against or disengage from the upper and lower molds 92, 91, and the injection seat 32 is controlled to move longitudinally back and forth to make the injection hole 341 of the injection unit 34 connect to or disengage from the feeding passage 53 of the upper mold mounting unit 50.

What mentioned are the structural relations of the main components of the embodiment, and for a better understanding of the operation and function of the present invention, please refer to the following descriptions.

Figure 2:
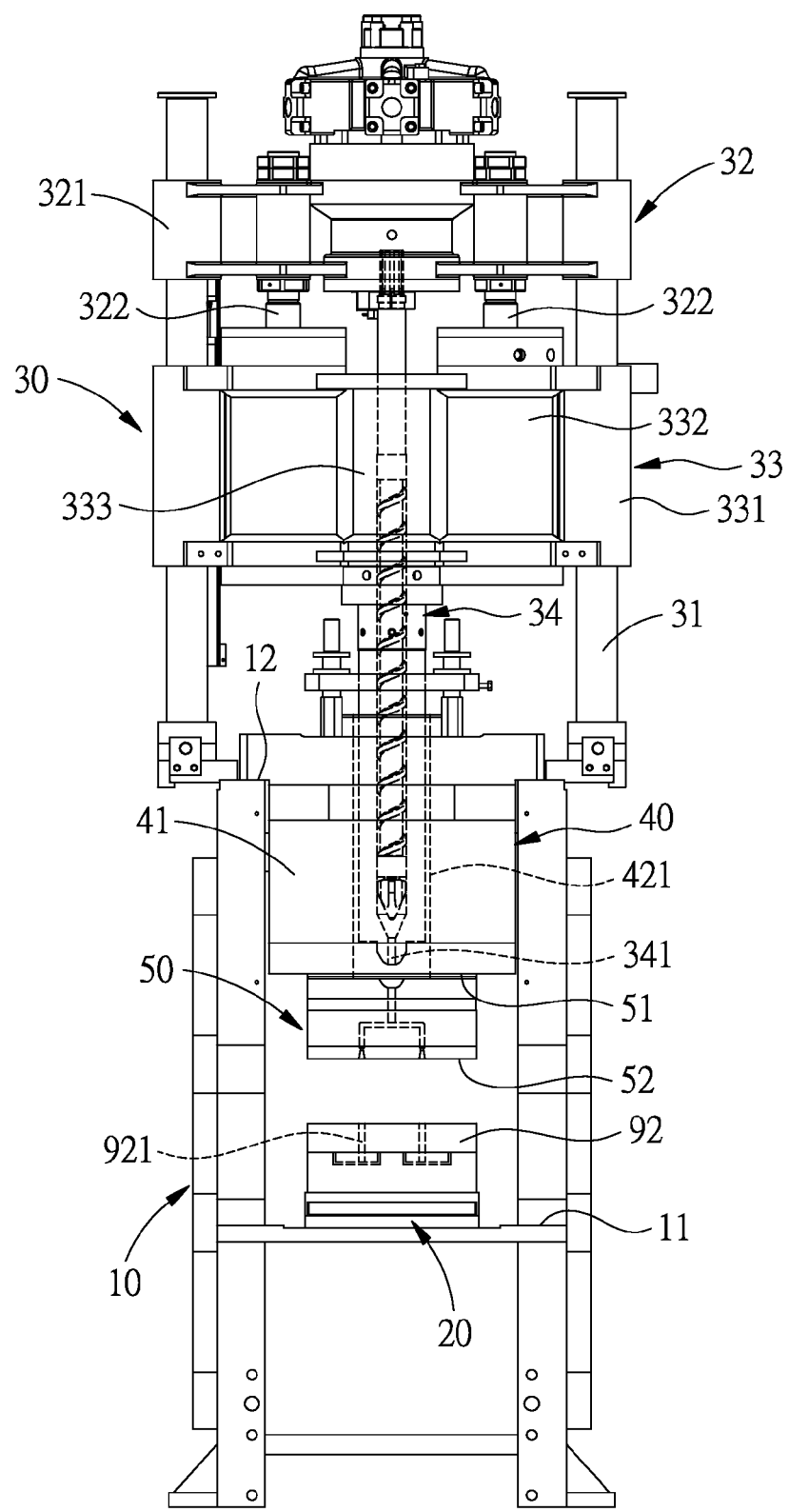
FIG. 2 is a front view of the vertical injection molding machine in accordance with the present invention.
Figure 5:
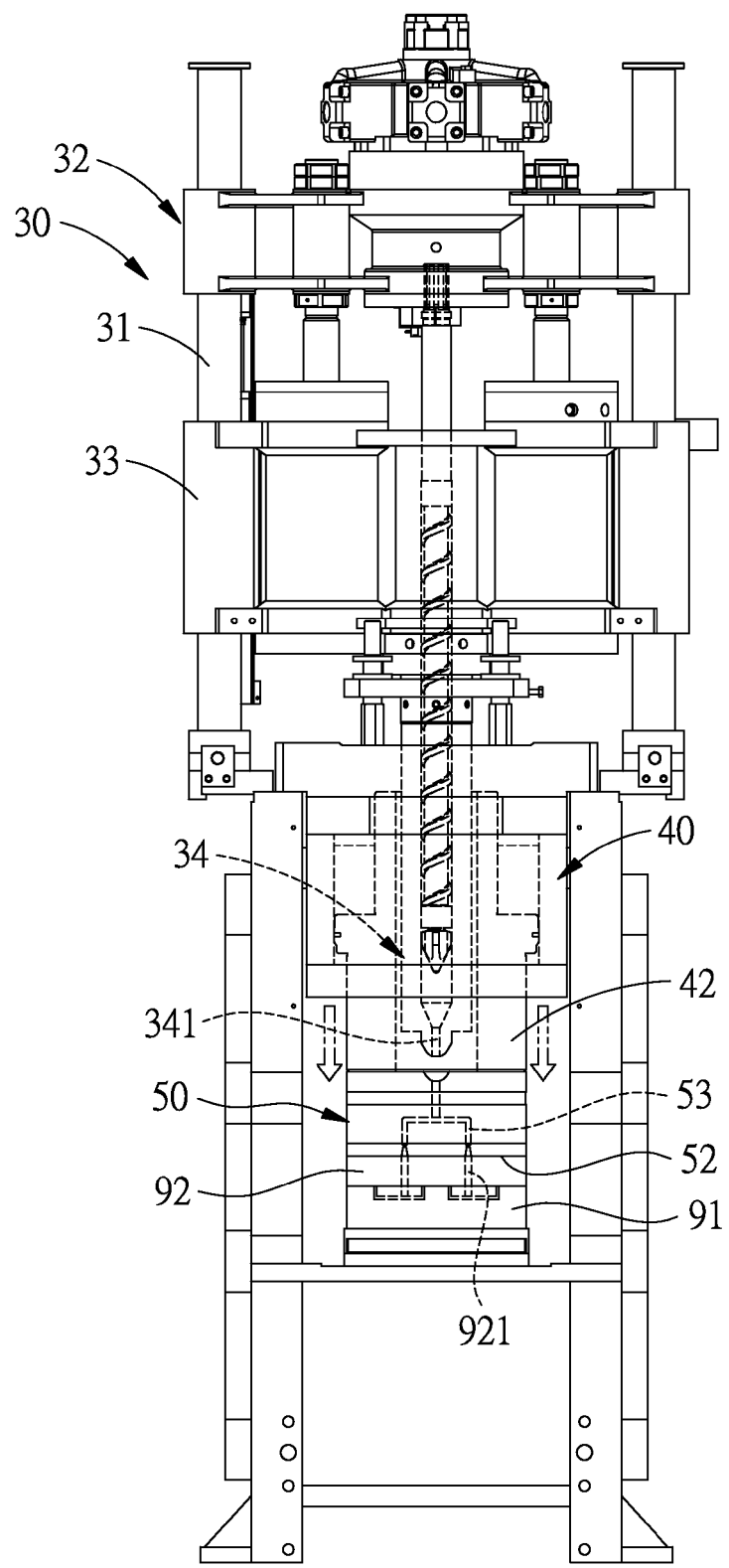
FIG. 5 is an operational view of the vertical injection molding machine in accordance with the present invention, showing that the pressing mold unit pushes the upper mold mounting unit to abut against the mold.

As shown in FIGS. 2 and 5, to perform injection molding in the vertical direction, the pressing mold unit 40 is initially controlled to move to make the pressing mold shaft 42 push the upper mold mounting unit 50 to move towards the lower mold mounting unit 20, until the lower surface 52 of the upper mold mounting unit 50 is pressed against the upper surface of the upper mold 92, so that the feeding passage 53 of the upper mold mounting unit 50 is connected to the upper mold feeding passage 921 of the upper mold 92.

Figure 6:
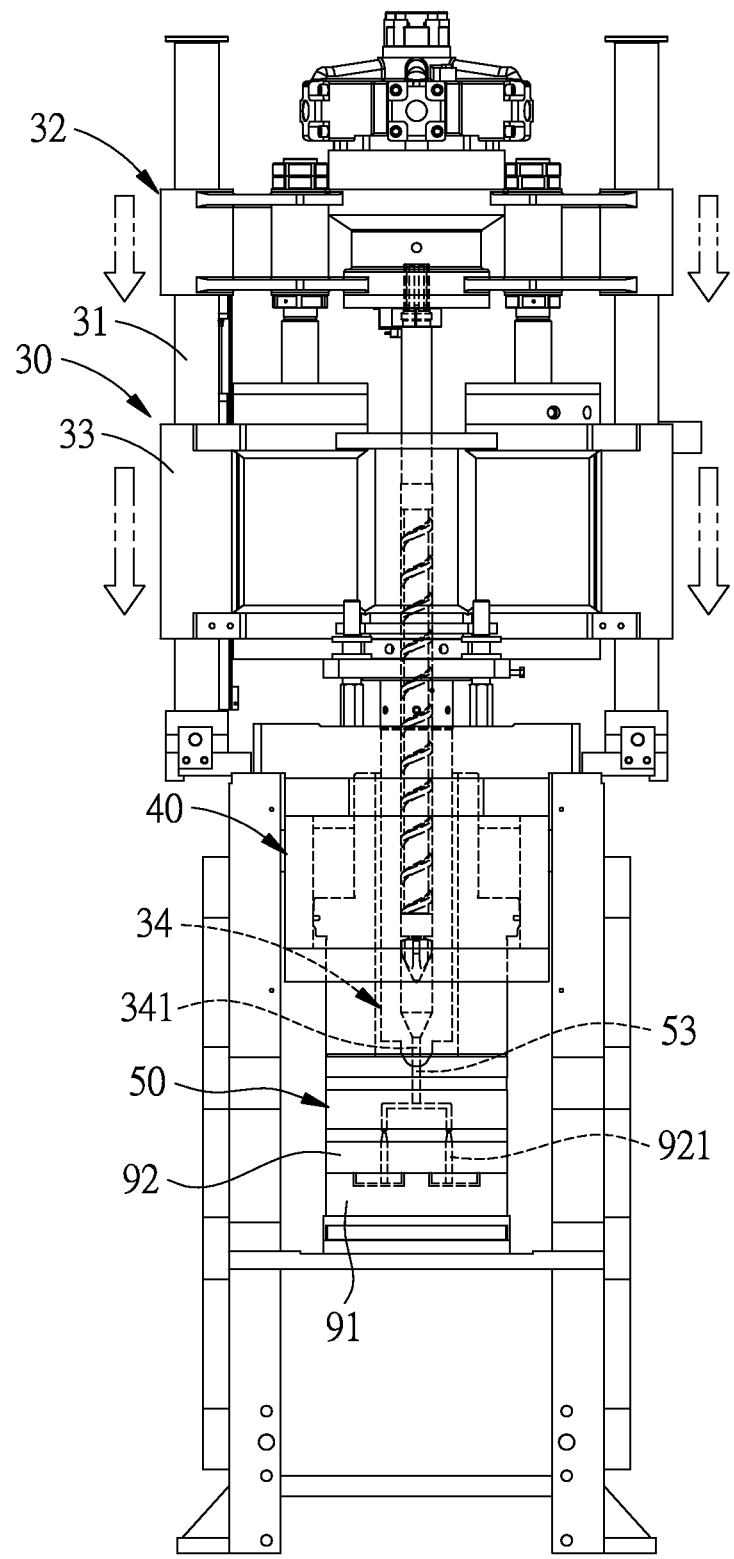
FIG. 6 is an operational view of the vertical injection molding machine in accordance with the present invention, showing that the injection hole of the injection unit is abutted against the feeding passage of the upper mold mounting unit.

Then, as shown in FIGS. 5 and 6, the injection seat 32 and the feeding seat 33 of the injection device 30 move along the guiding shafts 31 until the injection hole 341 of the injection unit 34 is abutted against the feeding passage 53 of the upper mold mounting unit 50 to allow material to be injected into the feeding passage 53, and then the material flows through the upper mold feeding passage 921 of the upper mold 92 into the mold cavity which is defined when the upper and lower molds 92, 91 are closed, so that the injection molding is finished.

Referring back to FIG. 2 again, since the pressing mold unit 40 and the injection device 30 are all disposed on the upper seat 12 of the base 10, and therefore are located above the lower seat 11, the lower mold mounting unit 20, the upper mold 92 and the lower mold 91, with this design, the height to the ground from the lower seat 11 can be substantially reduced, namely, the heights of the lower seat 11, the lower mold mounting unit 20 and the upper and lower molds 92, 91 with respect to the user are reduced to an ergonomic height, which makes operation of the injection molding easier and convenient, while reducing danger and enhancing work safety.

Figure 4:
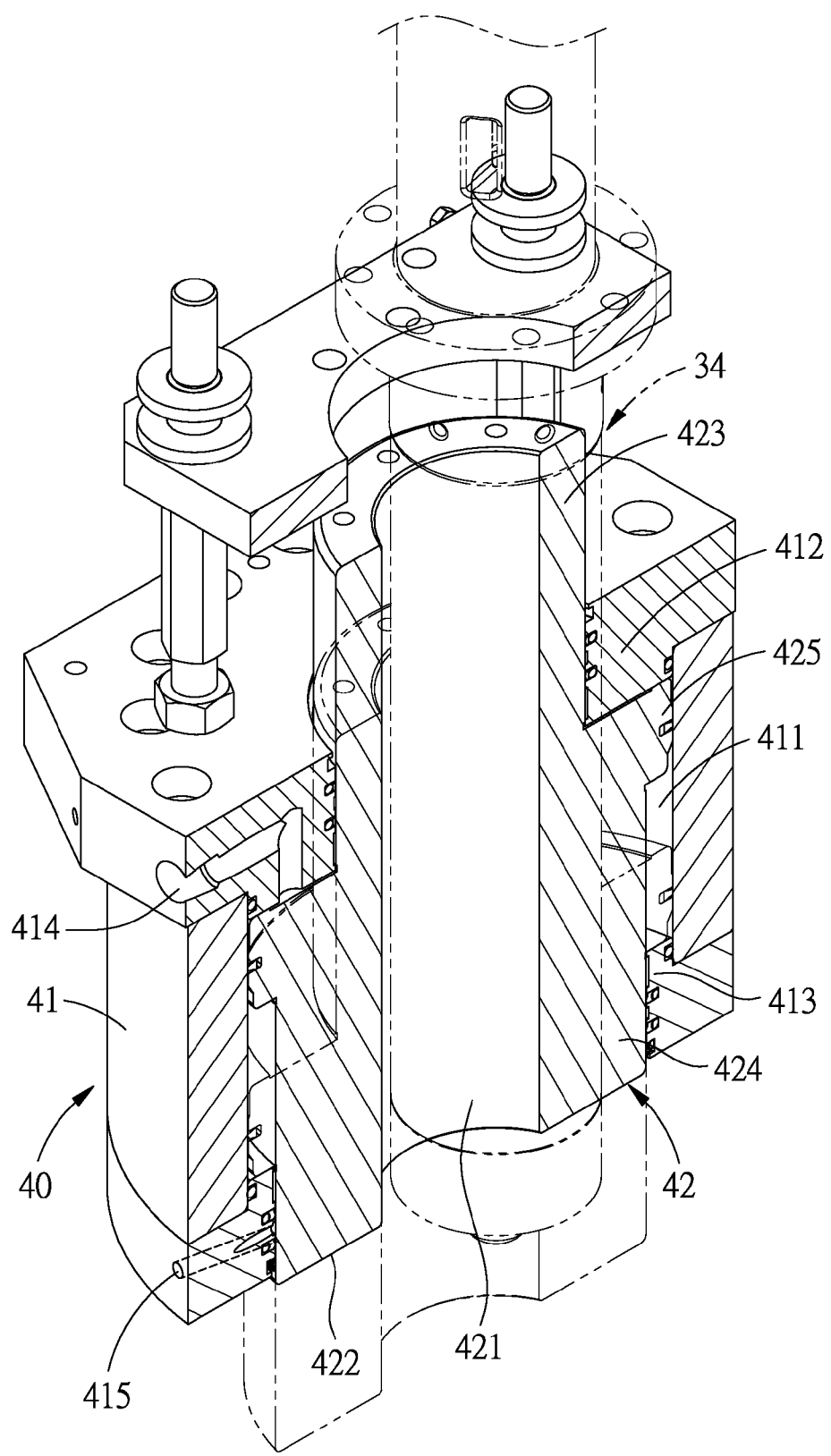
FIG. 4 is a cross sectional view of the vertical injection molding machine in accordance with the present invention, showing that the pressing mold unit is connected to the injection unit.

It is to be noted that, as shown in FIGS. 4 and 5, the longitudinally downward movement of the pressing mold shaft 42 of the pressing mold unit 40 is achieved by the injection of liquid into the first hole 414. When the upper and lower molds 92 and 91 are closed, maintaining the pressure of the injected liquid can prevent the upper and lower molds 92, 91 from separating from each other during injection molding. Besides, the longitudinally upward movement of the pressing mold shaft 42 of the pressing mold unit 40 is achieved by the injection of liquid into the second hole 415.

Referring then to FIG. 4, the pressing mold shaft 42 of the pressing mold 40 is provided with a longitudinal hole 421 for insertion of the injection unit 34, therefore, in addition to being used to pressing mold and keeping the molds closed, the pressing mold shaft 42 can also be provided for insertion of the injection unit 34, which facilitates to the injection molding in the vertical direction.

While we have shown and described various embodiments in accordance with the present invention, it is clear to those skilled in the art that further embodiments may be made without departing from the scope of the present invention.

What is claimed is:

1. A vertical injection molding machine comprising:
a base with a lower seat and an upper seat above the lower seat;
a lower mold mounting unit disposed at the lower seat and provided for mounting of a lower mold and an upper mold;
an injection device including a plurality of guiding shafts longitudinally disposed on the upper seat, an injection seat movably disposed on the guiding shafts, a feeding seat which is movable mounted on the guiding shafts and located between the injection seat and the upper seat, and an injection unit which is longitudinally disposed on the injection seat and inserted out of the feeding seat and includes an injection hole;
a pressing mold unit including a pressing seat and a pressing mold shaft, the pressing seat being fixed in the upper seat of the base and including a longitudinal hole, the pressing mold shaft being movably inserted in the longitudinal hole and also including a longitudinal hole for insertion of the injection unit, and a lower connecting surface; and
an upper mold mounting unit including an upper surface fixed to the lower connecting surface of the pressing mold shaft, a lower surface abutted against the upper mold, and a feeding passage which is in communication with the upper and lower surface and aligned with the injection hole;
by such arrangements, the pressing mold shaft is controlled to move longitudinally back and forth to press against or disengage from the upper and lower molds, and the injection seat is controlled to move longitudinally back and forth to make the injection hole of the injection unit connect to or disengage from the feeding passage of the upper mold mounting unit.

2. The vertical injection molding machine as claimed in claim 1, wherein the number of the guiding shafts is two, the injection seat further includes two injection sleeves sleeved onto the guiding shafts, and two pistons, the feeding seat further includes two feeding sleeves sleeved onto the guiding shafts, two piston sleeves which are disposed between the feeding sleeves and provided for insertion of the two pistons, and a feeding portion which is disposed between the two piston sleeves for insertion of the injection unit and includes a feeding hole.

3. The vertical injection molding machine as claimed in claim 1, wherein a first annular flange is disposed at an upper edge of the longitudinal hole of the pressing seat, at a lower edge of the longitudinal hole is disposed a second annular flange which is smaller than the first annular flange, the pressing mold shaft further includes a first shaft portion airtightly disposed in the first annular flange, a middle shaft portion airtightly disposed in the second annular flange, a second shaft portion located between the first and the middle shaft portions, and airtightly disposed in the longitudinal hole of the pressing seat, and the middle shaft portion is larger than the first shaft portion but smaller than the second shaft portion.

4. The vertical injection molding machine as claimed in claim 3, wherein the pressing seat further includes a first hole which is located adjacent to the first annular flange, and a second hole which is located adjacent to the second annular flange and in communication with the longitudinal hole of the pressing seat.

5. The vertical injection molding machine as claimed in claim 1, wherein the upper mold includes an upper mold feeding passage in communication with the feeding passage of the upper mold mounting unit.

* * * * *